United States Patent [19]

Green et al.

[11] Patent Number: 4,709,802

[45] Date of Patent: Dec. 1, 1987

[54] MASS PRODUCT HANDLING RING SYSTEM

[75] Inventors: Stephen H. Green; Robert W. Hofstetter, Sr; Robert W. Hofstetter, Jr., all of Clio, Mich.

[73] Assignee: I&H Conveying & Machine Company, Clio, Mich.

[21] Appl. No.: 573,629

[22] Filed: Jan. 25, 1984

[51] Int. Cl.[4] .............................................. B65G 37/00
[52] U.S. Cl. ................................. 198/465.1; 198/576; 198/580; 198/626; 198/803.15
[58] Field of Search ............... 198/472, 580, 795, 648, 198/796, 482, 372, 626, 464.2, 465.1, 803.01, 575, 576, 420, 803.15; 29/809, 822; 414/416

[56] References Cited

U.S. PATENT DOCUMENTS

| | | | |
|---|---|---|---|
| 2,653,743 | 9/1953 | Stenger | 198/648 X |
| 3,225,513 | 12/1965 | Ehe | 198/472 X |
| 3,289,867 | 12/1966 | Burke | 198/626 X |
| 3,410,406 | 11/1968 | Tsuda et al. | 198/472 |
| 3,703,232 | 11/1972 | Zbiegien | 198/396 X |
| 3,773,192 | 11/1973 | Moore et al. | 198/637 X |
| 4,274,532 | 6/1981 | Johnson | 198/648 X |
| 4,305,496 | 12/1981 | Hoppmann et al. | 198/465.1 X |
| 4,636,129 | 1/1987 | Lanham, Jr. | 198/465.1 X |
| 4,645,061 | 2/1987 | Welch | 198/420 |

FOREIGN PATENT DOCUMENTS 2741788   1/1979   Fed. Rep. of Germany ...... 198/372

Primary Examiner—Joseph E. Valenza
Assistant Examiner—Jonathan D. Holmes
Attorney, Agent, or Firm—Krass and Young

[57] ABSTRACT

A conveyor system for the mass transport and handling of articles or containers through any packaging and/or processing cycle (for example, uncasing, filling, cooling, sorting, recasing) wherein the individual articles or containers are, at some point in the handling cycle, surrounded or encased by a removable cylindrical ring, enabling the containers for items to be efficiently moved and treated in the packaging and/or processing cycle; the system also includes a mechanism for removal and recycling of the removed rings.

11 Claims, 7 Drawing Figures

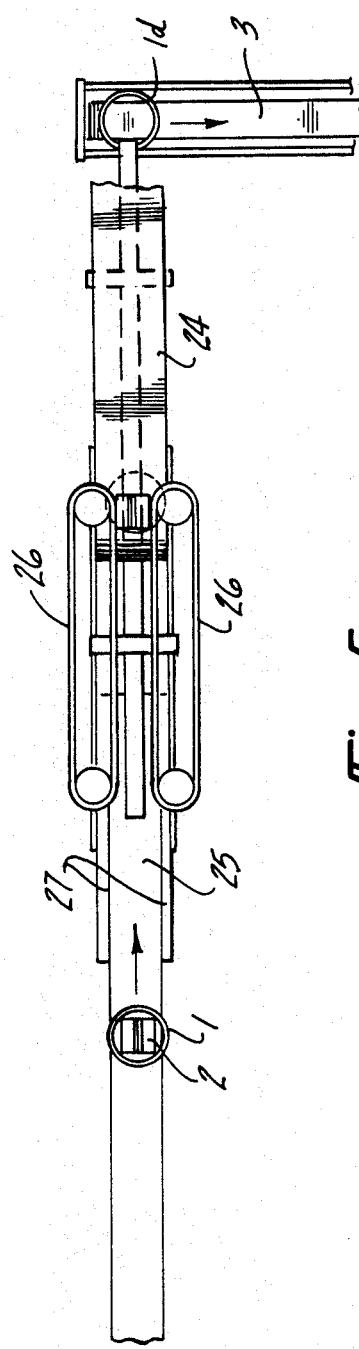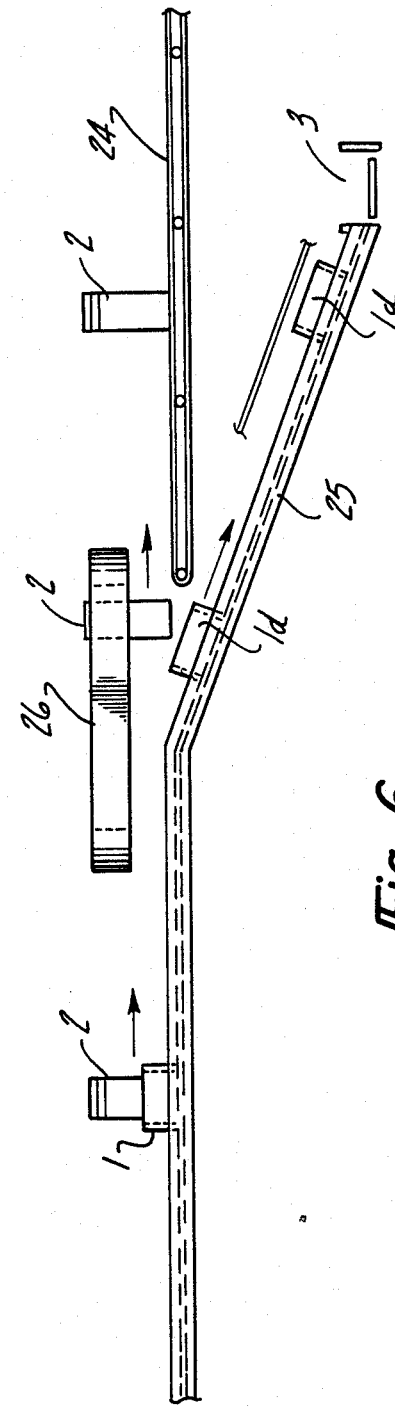

MASS PRODUCT HANDLING RING SYSTEM

RELATED APPLICATION

None.

FIELD OF THE INVENTION

This invention and process are intended to be used with conveyor-type systems for product handling.

DESCRIPTION OF THE PRIOR ART

Numerous methods have been devised in the product-handling field for the separation of individual units in the line of transport, and for allowing said articles to be expeditiously moved in large groups through the various stations in product handling, such as uncasing, moving, heating, cooling, sorting and recasing. Where the containers or articles being moved on the line are irregularly shaped, numerous problems have arisen in the form of jamming and damage to articles or containers when the mechanical force is exerted by the conveyor system and the surrounding items in a mass movement configuration cause damage or jamming of the articles or containers and their associated conveying equipment. This problem has been treated largely by the separation of irregularly shaped or fragile articles or containers in movement through the various treating stages, which is both complicated and expensive. The problem is compounded where a heating cycle is used in the packaging or processing system, particularly where the containers are constructed from paperboard products or thin plastics. The application of external heat to the container acts to further deteriorate the strength of the walls of the container, making the container even less resistant to the forces and pressures imposed by the packaging or processing cycle. This new process allows such fragile or irregularly shaped articles or containers to be treated as if they were cylindrical, by placement of a rigid ring of appropriate size around each item prior to its collection and treatment as part of the mass of items. Thus, the individual articles or containers can be massed, pushed, collected and handled in the ordinary fashion of cylindrical containers without concern for damage to the article or container. Since the rings around each item are removable and reusable, the product handling may take place in both a mechanically and economically efficient fashion. The new process also provides for regular spacing between articles or container of irregular size, to enable efficient heating and cooling of the filled articles or containers in a packaging or processing system encompassing such heating and cooling.

SUMMARY OF THE INVENTION

It is the object of this invention to provide a new and novel method of handling a mass of articles or containers in an assembly line or conveyor equipment.

Another object of this invention is to provide protection to fragile articles or containers, while allowing them to be moved rapidly and inexpensively through conventional conveying and treating type facilities, in the same fashion as cylindrical containers.

A further object of this invention is to provide spacing between individual articles or containers moving in a conveyor-environment, for purposes of more efficiently treating (e.g., cooling) each article or container, by maintaining good separation from neighboring articles or containers on the conveyor system.

A further object of this invention is to provide a reusable spacing device, easily installed and easily removed from the articles or containers moved in a product handling system.

A further object of this invention is to provide a method or process whereby a mass of articles or containers in the assembly line or conveyor environment may be conveniently moved and processed without regard to the irregular shape or strength of the articles or container itself, and without regard to the effects of heat or cooling on the articles or container.

A BRIEF DESRIPTION OF THE DRAWINGS

A better understanding of the present invention will be had upon reference to the following detailed description when read in conjunction with the accompanying drawings, wherein like reference characters refer to like parts throughout the several views, and in which:

FIG. 5 is a top view of that portion of the system wherein the rings are removed from the product; and FIG. 6 is a side view of FIG. 5.

DETAILED DESCRIPTION OF A PREFERRED EMBODIMENT OF THE PRESENT INVENTION

Figure 1:
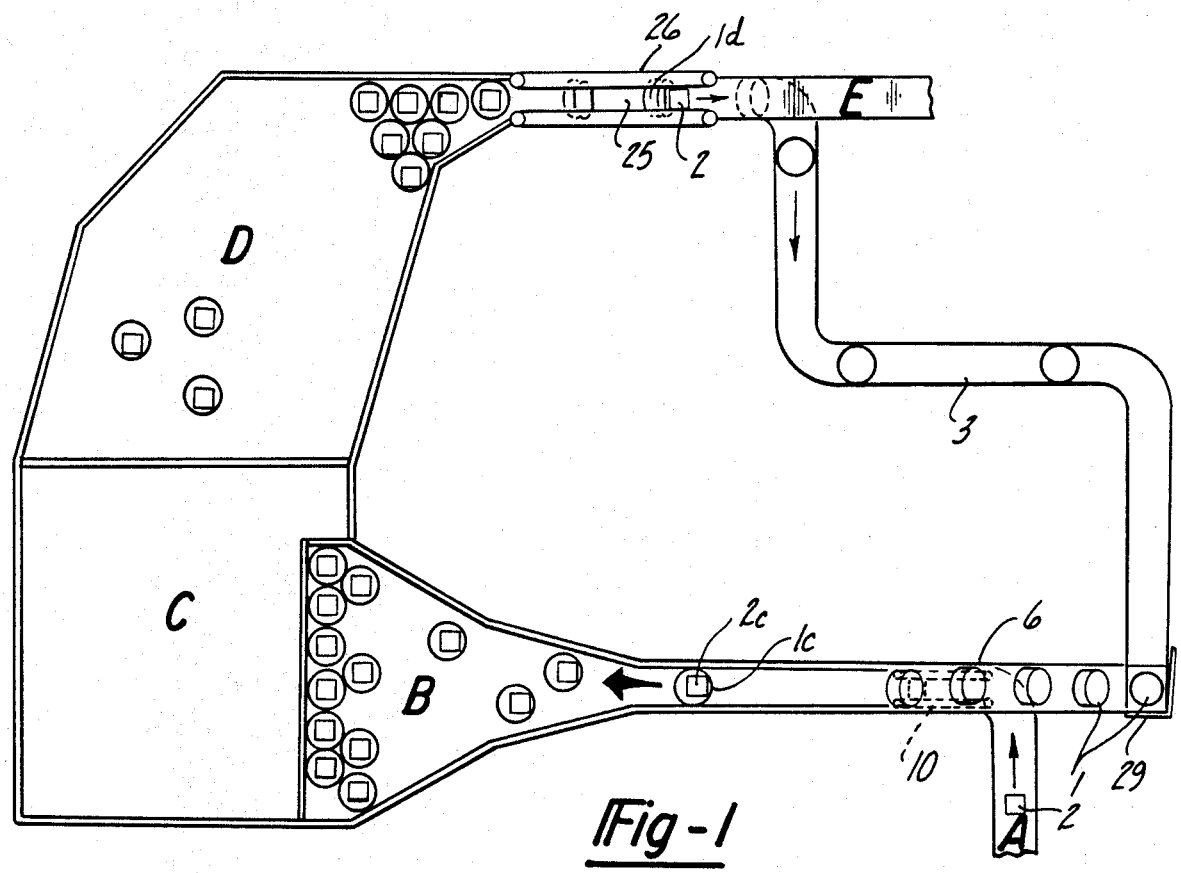
FIG. 1 is a top diagrammatic view illustrating a conveyor system with ring installation and removal means according to the present invention.

With reference to FIG. 1, a conveyor system is shown which comprises a conveyor means A for delivery of a product container or fragile product to a ring installation chute 6. A series of sturdy cylindrical rings 1 are delivered to said ring installation chute 6 via ring delivery conveyor 3.

After installation of the ring 1, the combination of product and ring is transported to accumulator station B, for processing or treatment at processing station C.

The combination of ring and product is ejected to distribution staton D, and directed therefrom to ring removal conveyor 26.

A conveyor system E is provided to divert the product for further processing or handling, while the conveyor system 3 is installed in conjunction with E for transport of the removed ring to the ring delivery point. The rings are returned to the ring installation chute 6 by means of said delivery conveyor 3.

Figure 2:
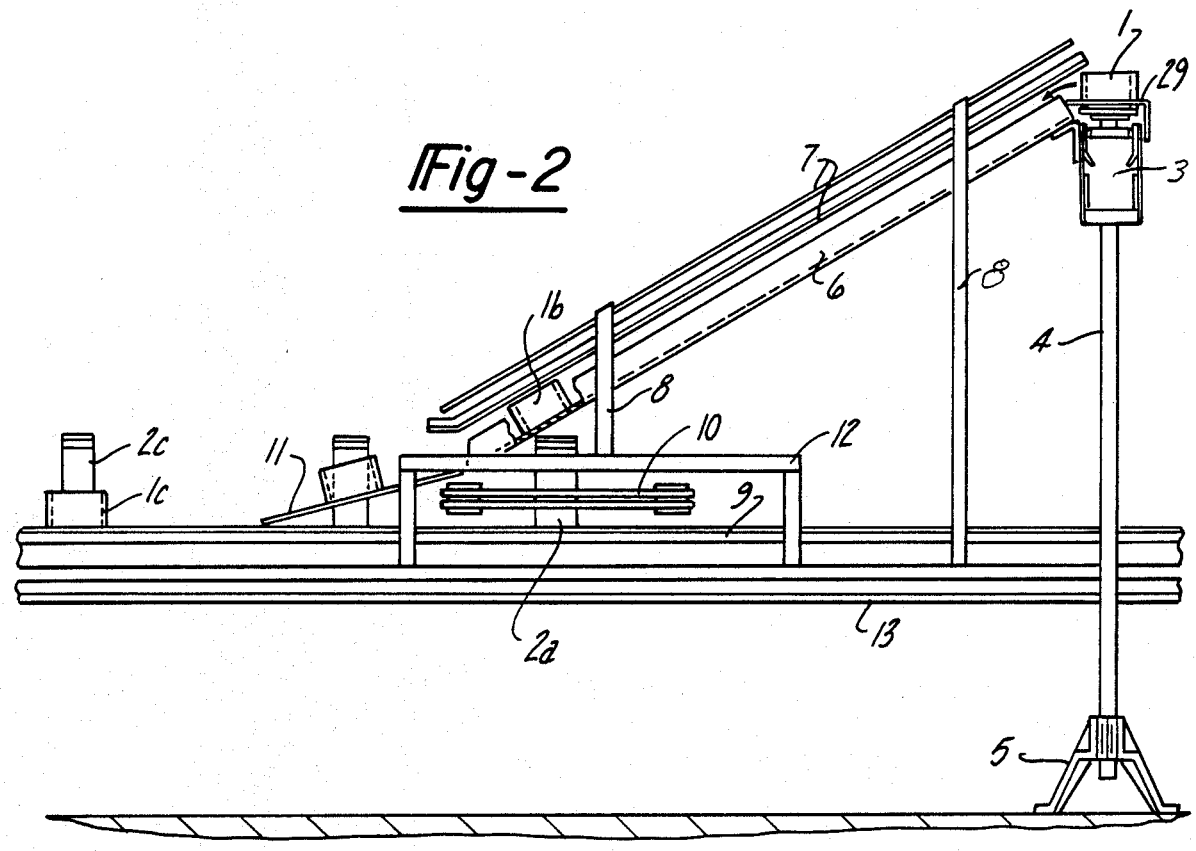
FIG. 2 is a side view of the ring installation portion of the conveyor system.

Referring to FIG. 2, a conventional endless belt conveyor 3, with suitable supports, 4 and 5, is operatively associated with a chute 6 by means of a guide 29.

With reference again to FIG. 2, a cylindrical ring 1, constructed of high impact plastic or similar strong material, and having an inside diameter sufficient to enclose the articles or containers processed in the entire system, and an outside diameter of sufficient size to enable it to move through the appropriate conveyors and guides is presented. Conveyor 3 is positioned with guide 29 to divert the ring 1 into chute 6.

Chute 6 guides ring 1, in conjunction with guides 7 into position above product delivery conveyor 9 and timing conveyor 10. Chute 6 and guides 7 are supported by chute supports 8, at an appropriate height above the product delivery conveyor 9, and the product conveyor support 13. Support 12 provides further support for chute 6 and timing conveyor 10, as well as support for product sensing switches and control solenoids 14, 20 and 18, as shown in FIGS. 2A and 3.

Referring now to FIG. 2, a product or container 2c is shown with ring 1c fully installed, a product container 2a is shown in the process of being surrounded by ring 1b.

Figure 2A:
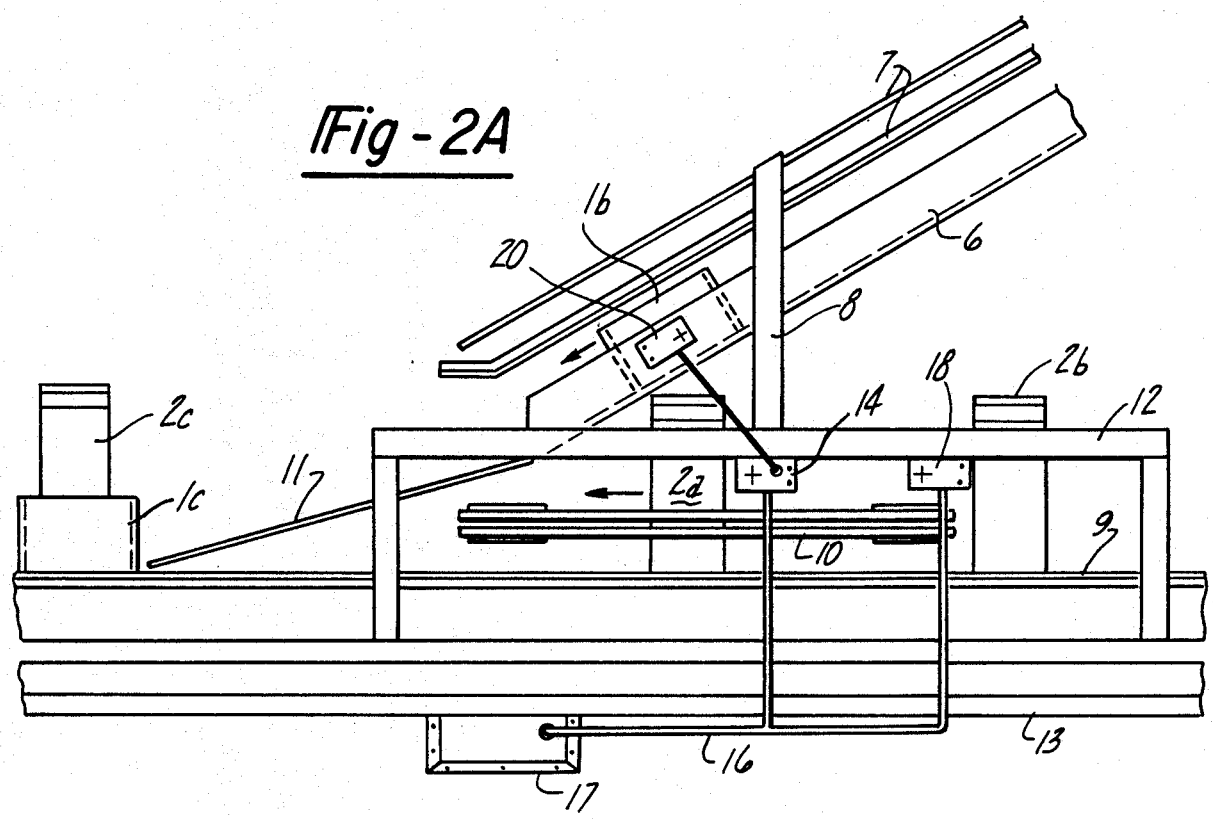
FIG. 2A is an enlargement of FIG. 2, with the addition of control and sensing switches and equipment.
Figure 3:
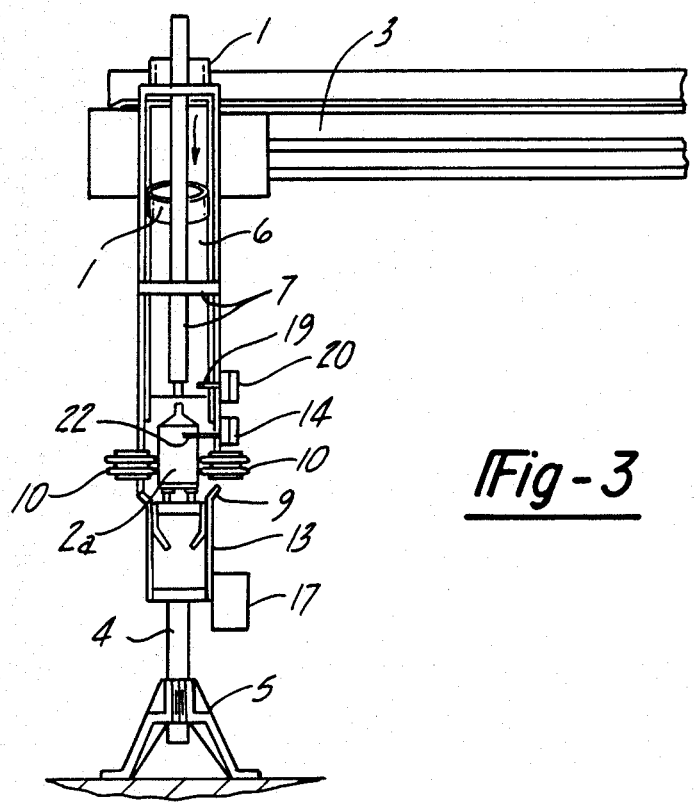
FIG. 3 is an elevational view of FIG. 2.
Figure 4:
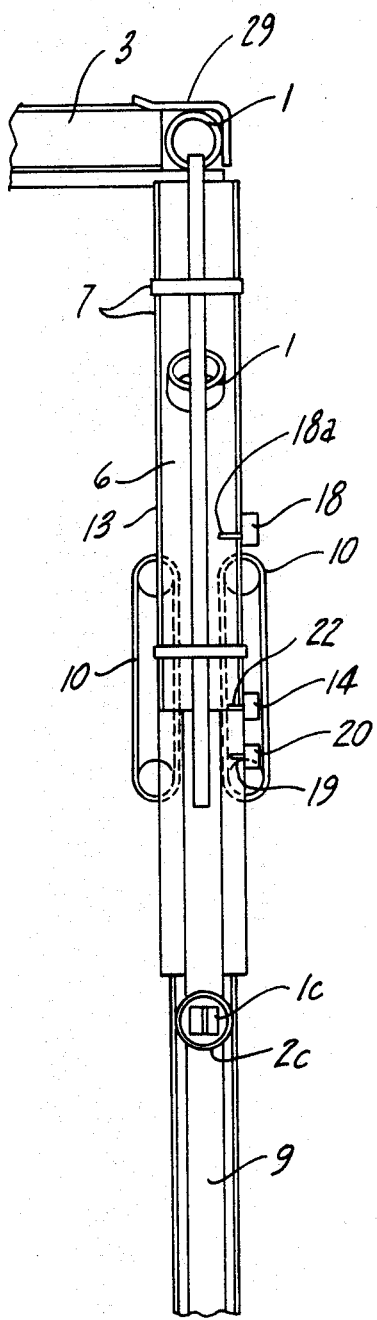
FIG. 4 is a top view of FIG. 2.

Referring now to FIG. 2A, timing control circuitry is contained within circuits 17, which is electronically coupled through signal wires 16 to the product control solenoid 18, the product sensing switch 14, and the ring control solenoid 20.

Referring now to FIGS. 1, 2, 2A, 3 and 4, two simultaneous delivery operations occur. For purposes of illustration, these processes will be described separately until such time as the illustration of the ring around the product or container takes place.

From ring delivery conveyor 3, rings move along said conveyor system to a point in direct connection with the upper end of chute 6. Fresh rings 1 are pushed into chute 6 by the pressure of the rings moving along conveyor 3. In this fashion, a regular and continuous supply of rings is maintained in chute 6.

Ring 1 slides down chute 6, retained by guides 7. Said ring 1 slides, by force of gravity, into position in chute 6. Several rings 1 are linearly disposed along the floor of chute 6, awaiting application to the product.

Moving now to conveyor 9, products or containers for products are serially disposed along said conveyor surface 9, supported by conveyor supports 13. Said product containers may or may not be regularly spaced. Upon reaching product control solenoid 18, the article is restrained from further travel, for example, by product control solenoid 18 and plunger 18a. Said product control solenoid is electronically coupled to product sensing switch 14 by sensing wires 16 through timing control circuits 17. Upon deflection of product sensing switch lever 22 by product or container 2a, product control solenoid 18 operates to release product or container 2b between the belts of timing conveyor 10.

Timing conveyor 10 operates at a speed designed with consideration for the movement of ring 1b upon the release of said ring 1b by ring control solenoid 20. In this fashion, upon operation of product sensing switch 14 by a product moving along product timing conveyor 10, ring control solenoid 20 in combination with control solenoid plunger 19 is activated, releasing ring 1b in appropriate timing with product 2a. The ring 1b is guided over the product 2a by virtue of ring guides 11 to insure that the ring 1b comes fully to rest on the surface of the conveyor.

The release of ring 1b resets timing circuits 17, allowing entry of product container 2b into timing conveyor 10, wherein the entire cycle repeats.

The combined product 2c and ring 1c move through to accumulator station B, treatment station C and distribution station D, as shown in FIG. 1, at which time they are presented by normal conveying means to the entry point of the combination conveyor for the process of ring removal.

Referring now to FIGS. 5 and 6, the product 2 and ring 1 move along a combination conveyor 27. A pair of product support conveyors 26 are disposed on opposite sides of conveyor 27, with said conveyor belts 26 moving in the same direction as the belt on conveyor 27, and with the same longitudinal speed. The inner faces of said conveyor belts 26 are disposed at an appropriate vertical distance from the surface of conveyor 27, so as to allow ring 1 to pass under said belts 26 without contacting said belts. Additionally, said belts 26 are disposed a prescribed distance apart from one another so as to securely grip the sides of product or container 2 without damaging same, and to support said product or container 2 by its upper portion. As said product 2 and ring 1 move into the product support conveyor area of the system, the ring as shown now as 1d, falls by force of gravity from the bottom of the product or container 2, where it is transported down ring discharge chute 25 to ring delivery conveyor 3.

Referring specifically to FIG. 6, the product supported by product support conveyor 26 is carried to product discharge conveyor 24.

Now referring to FIG. 1, ring 1 is routed via delivery conveyor 3 to ring installation chute 6 and the product, now separated from its surrounding ring, is conveyed along conveyor E to the next process in the packaging or treating cycle.

The conveyor system of the present invention is advantageous in a number of different respects.

First, since the articles or containers 2 are completely surrounded by ring 1, said articles or containers 2 are protected from damaging impact with adjacent articles or containers, as well as the various walls and guides installed in the overall system.

The present invention is further advantageous in that the rings 1 serve to space the articles or containers 2 from neighboring articles, effectuating heating and cooling processes.

A still further advantage of the present invention is the cylindrical shape of the rings 1, which enable the articles or containers to be handled in a large mass, in systems designed for handling cylindrical objects (such as bottles or cans) without regard to the shape of the handled article or container.

A still further advantage of the present invention is the availability of a reusable enclosure for the articles or containers handled, readily removable and installable and able to withstand repeated machine cycles without damage.

A still further advantage of the present invention is the relatively simple timing system required for installation of the rings over the articles or containers, coupled with the similarly simple system of removal of said rings, which requires no timing mechanism or other sophisticated queing mechanism or electronics.

A still further advantage of the present invention is the ability to accumulate and distribute the articles or containers 2 so surrounded by ring 1 within the confines of an existing processing cycle suited for handling cylindrical goods, i.e., existing installations equipped to handle bottles, cans and the like may readily adapt portions of the system with minimal expense.

A still further advantage of the present invention is the ability to utilize lightweight and fragile containers in the enclosure of certain products, where heretofore heavy and expensive containers were required.

From the foregoing, it can be seen that the conveyor system according to the present invention provides many advantages over the previously known systems for the mass handling of irregularly shaped or fragile articles or containers.

Having described our invention, however, many modifications thereto will become apparent to those skilled in the art to which it pertains without deviation from the spirit of the invention as defined by the scope of the appended claims.

We claim:

1. A method for mass handling of articles in a conveyor line environment comprising:
   (a) positioning individual rigid cylindrical rings in a ring delivery chute adjacent to an article-carrying conveyor line;
   (b) separating said articles on said article-carrying conveyor line by automatic timing circuitry;
   (c) sensing the presentation of said individual articles to a point adjacent to said ring delivery chute;
   (d) releasing a single rigid cylindrical ring from said chute to encircle said article;
   (e) discharging the combined article and cylindrical ring to an article processing station;
   (f) removing said rings from said articles;
   (g) discharging said articles from the conveyor environment; and,
   (h) returning said rings by conveyor means to the delivery chute for reuse.

2. The invention method of mass handling of articles according to claim 1, wherein the delivery chute is placed directly above the article conveyor line, and wherein the rings are allowed to fall by force of gravity over the article.

3. The method of mass handling of articles according to claim 1, in which said method further comprises the use of a timing conveyor for separating said individual articles.

4. The method of mass handling of articles according to claim 1, in which said method further comprises transporting the combined article and cylindrical ring by a first conveyor, away from the article processing station, directing said article and ring into a pair of conveyor belts disposed on opposite sides of said first conveyor, gripping the article only between said pair of conveyor belts, transporting said article over a gap in said first conveyor, allowing said ring to fall through said gap in said first conveyor, directing said rings to a third conveyor and depositing said article on said first conveyor at a point beyond said gap.

5. The method of mass handling of articles according to claim 4, in which said method further comprises the transportation by conveyor of said rings to the ring delivery chute.

6. A method for mass handling of articles as described in claim 1, wherein said automatic timing circuitry further comprises sensing the presence of said ring in a position suitable for release adjacent to said article, sensing the presence of an article adjacent to said ring, inhibiting the release of said ring in the absence of a signal indicating the presence of said article, and inhibiting the discharge of said article to said processing station in the absence of a signal indicating the presence of said ring.

7. A method for mass handling of articles as described in claim 1, wherein said articles are polygonal in shape and wherein said rings are at least as large in internal diameter as the longest horizontal cross-sectional measurement of the outside of said article, and wherein said ring encircles said article and moves on the same conveyor surface with said article.

8. An apparatus for mass handling of articles in a conveying line environment comprising:
   (a) a ring delivery chute adjacent to an article carrying conveyor line;
   (b) means for separation of said articles on said article carrying conveyor line by automatic timing circuitry;
   (c) means for sensing the presentation of said individual articles to a point adjacent to said ring delivery chute;
   (d) means for releasing a single rigid cylindrical ring from said chute to encircle said article;
   (e) means for discharging the combined article and cylindrical ring to an article processing station;
   (f) means for removing said rings from said articles;
   (g) means for discharging said articles from the conveyor environment; and
   (h) conveyor means transporting said rings to said delivery chute for reuse.

9. The invention as described in claim 8, wherein said means for separation for said articles on said article carrying conveyor line by automatic circuitry further comprises:
   (a) a conveyor to deliver said articles to a particular point on said conveying line environment;
   (b) means for stopping the movement of said articles on said conveyor;
   (c) means for release of one individual article from said stopping means;
   (d) a constant speed conveyor means disposed adjacent to said release means; and
   (e) article sensing means disposed adjacent to said constant speed conveyor means.

10. The invention as described in claim 8, wherein said means for sensing the presentation of said individual articles and means for releasing a single cylindrical ring further comprises:
    (a) means for sensing the location of said article;
    (b) means for sensing the location of said ring; and
    (c) timing means further comprising an electrical comparator circuit, said circuit providing a positive electrical signal in the presence of an electrical signal from the article location sensing means.

11. The invention as defined in claim 8, wherein said means for removing said rings from said articles further comprises:
    (a) conveyor means for transport of said article and said ring in a straight line, supported at the bottom of said article and said ring;
    (b) second conveyor means disposed at each side of the discharge end of said conveyor means;
    (c) a slanted flat surface located under the second said conveyor means;
    (d) a third conveyor disposed at the discharge end of said second conveyor; and
    (e) a fourth conveyor disposed at the discharge end of said flat surface.

* * * * *